United States Patent [19]

Moss et al.

[11] Patent Number: 5,793,989
[45] Date of Patent: Aug. 11, 1998

[54] DUAL FUNCTION INTERFACE FOR PCMCIA COMPATIBLE PERIPHERAL CARDS AND METHOD OF USE THEREIN

[75] Inventors: Barry Moss, Matsqui; Denis Beaudoin, Surrey, both of Canada; Michael H. Retzer, Palatine, Ill.

[73] Assignee: Motorola, Inc., Schaumburg, Ill.

[21] Appl. No.: 746,048

[22] Filed: Nov. 6, 1996

Related U.S. Application Data

[63] Continuation of Ser. No. 253,995, Jun. 3, 1994, abandoned.
[51] Int. Cl.$^6$ ................................................. G06F 13/00
[52] U.S. Cl. ............................................. 395/285; 395/882
[58] Field of Search ..................................... 395/285, 882, 395/883, 280

[56] References Cited

U.S. PATENT DOCUMENTS

| | | | |
|---|---|---|---|
| 4,455,620 | 6/1984 | Watanabe et al. | 364/DIG. 1 |
| 4,456,965 | 6/1984 | Graber et al. | 364/DIG. 1 |
| 4,641,261 | 2/1987 | Dwyer et al. | 364/DIG. 1 |
| 5,084,814 | 1/1992 | Vaglica et al. | 364/DIG. 1 |
| 5,101,498 | 3/1992 | Ehlig et al. | 395/800 |
| 5,140,679 | 8/1992 | Michael | 364/DIG. 2 |
| 5,343,319 | 8/1994 | Moore | 359/152 |

*Primary Examiner*—Ayaz R. Sheikh
*Assistant Examiner*—Xuong Chung-Trans
*Attorney, Agent, or Firm*—J. Ray Wood

[57] ABSTRACT

A dual function interface operating in a Personal Computer Memory Card International Association (PCMCIA) mode of operation switches to an alternative interface operating in the appropriate mode of operation as defined by the alternative interface system specification. This is accomplished by setting a unique combination of address lines (203) and/or control lines (202) and automatically and transparently switching from the PCMCIA mode of operation to the alternate mode operation in response to the unique combination.

17 Claims, 2 Drawing Sheets

DUAL FUNCTION INTERFACE FOR PCMCIA COMPATIBLE PERIPHERAL CARDS AND METHOD OF USE THEREIN

This is a continuation of application Ser. No. 08/253,995, filed Jun. 3, 1994 and now abandoned.

FIELD OF THE INVENTION

This disclosure deals generally with computing device interfaces and more specifically but not limited to a computing device with an interface that is capable of supporting a PCMCIA compatible peripheral device interface and an alternative interface.

BACKGROUND OF THE INVENTION

In recent years, computing devices have decreased in size to the point where they are easily transportable. Some of the smallest devices conveniently fit into the palm of ones hand. This miniaturization of computer systems has led to the introduction of a new standard for computer peripheral devices (mainly data storage and data communication devices) by the Personal Computer Memory Card International Association (PCMCIA). The PCMCIA, PC Card Standard, Release 2.0, published by the Personal Computer Memory Card International Association, 1030B East Duane Avenue, Sunnyvale Calif. is based on a credit card size form factor for these new devices and specifies a 68-pin connector as well as the electrical interface for that 68-pin connector.

As a result, manufacturers are now faced with the complication of producing two or more versions of the same peripheral device, one for use with computers which have a PCMCIA compatible peripheral slot and one for computers which support older standards, such as, RS-232 serial interface or "Centronics" parallel interface.

To avoid this complication manufacturers would typically use an additional connector to couple and multiplex incompatible interfaces having incompatible modes of operation to one another. This technique while possibly viable in the stationary computer environment is unattractive for the transportable computer environment where the weight and dimensions of a computing device are critical as defined by the PCMCIA standard.

In furtherance of these concerns the PCMCIA standards and associated physical dimensions are attractive to the transportable computer market but these dimensions are not large enough to support an additional connector for one or more non-PCMCIA interfaces. Clearly an urgent need exists for an apparatus that is within the physical dimensions dictated by the current PCMCIA trend and is additionally capable of detecting the type of electrical interface that the computing device is expecting and further transparently and automatically transforming itself into that interface type.

DETAILED DESCRIPTION OF A PREFERRED EMBODIMENT

Generally the present invention provides an apparatus and method for multiplexing or switching an interface, between a computing device and a peripheral device, from a PCMCIA mode of operation to an alternate mode of operation, such as a serial mode of operation. The PCMCIA mode of operation implies a PCMCIA interface intended to be compliant or compatible with the PCMCIA standard(s). Similarly an alternate mode of operation implies an alternative interface as defined by the alternative interface specification. This is accomplished by applying or setting a unique code by, for example, selecting a unique combination of address and/or control signals to provide a code signal and, responsive to the code signal, switching from the PCMCIA mode of operation to the alternate mode of operation.

By having the capability of operating in multiple modes, specifically a PCMCIA and an alternate mode, the interface as described in the present invention, advantageously eliminates the need to allocate space for additional interface connectors, such as, for example an RS-232, RJ-11, or RJ-45 or the expense associated with supporting multiple peripheral devices.

Figure 1:
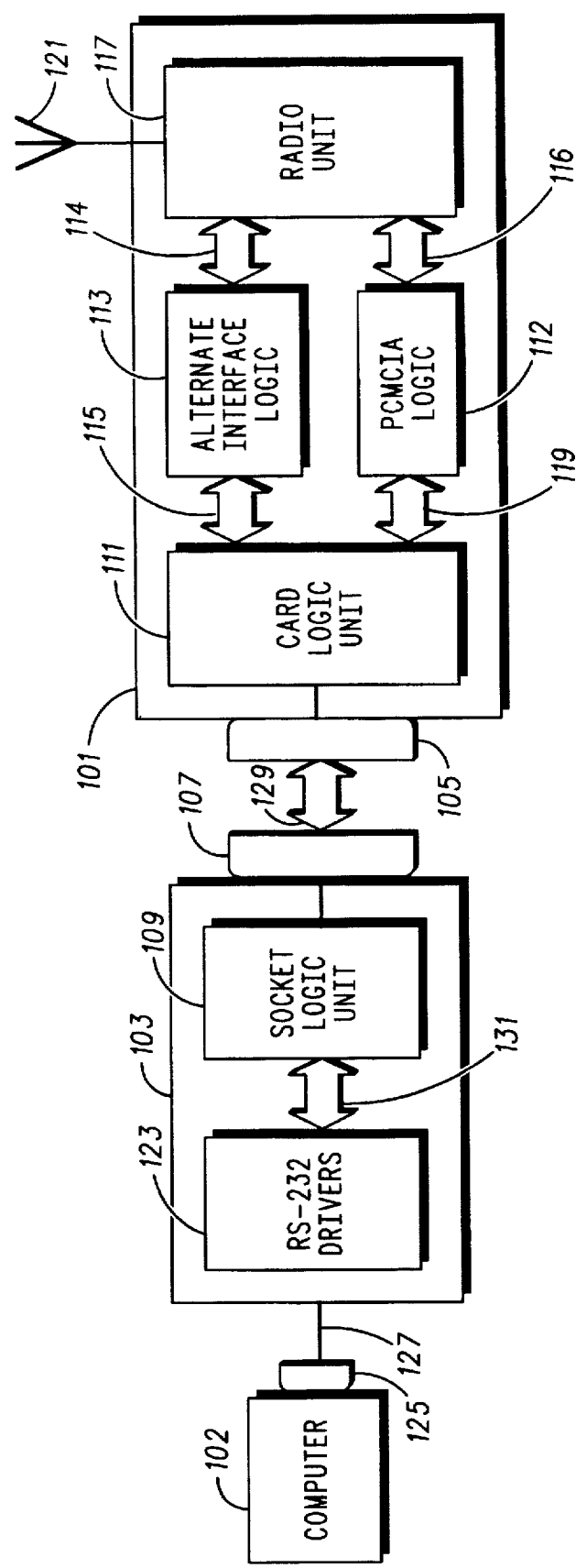
FIG. 1 is a block diagram of a system having an interface in accordance with one embodiment of the present invention.

The present invention, both apparatus and method embodiments, can be more fully described and appreciated with reference to the Figures in which FIG. 1 is a block diagram of a system having an interface in accordance with one embodiment of the present invention. The system of FIG. 1 includes a computing device (100) and a peripheral device (101), preferably a wireless data communications modem, inter coupled at an interface (129). The computing device (100) includes a computer (102) and an applications device (103), coupled together at a computer input/output (I/O) (127) that is depicted in FIG. 1 as an alternative interface, specifically a RS-232 data bus.

The peripheral device (101) comprises a PCMCIA 68-pin female mechanical connector (105), a Card Logic Unit (111), a PCMCIA electrical bus (119), a PCMCIA logic (112), a PCMCIA radio interface bus (116), a card alternative interface bus (115), a card alternative interface logic (113), an alternative radio interface bus (114), a Radio Unit (117) and an antenna (121).

The applications device (103) is a relatively inexpensive and unsophisticated arrangement that provides a physically compatible interface for the peripheral device (101) and an electrically compatible interface for the computer (102). The applications device (103) while depicted as a separate unit may be built into or part of the computer (102), such as where the computer has a physically compatible PCMCIA slot. Ordinarily in such a case this slot would also support the PCMCIA electrical or logical interface standards, in which case the peripheral device would likely operate in a PCMCIA mode of operation rather than the alternative mode of operation. In any event the application device (103) of FIG. 1 comprises a Socket Logic Unit (109), RS-232 drivers (123), a PCMCIA 68-pin male mechanical connector (107), a socket alternative bus (131), a computer I/O (127) and a connector (125).

In accordance with the preferred embodiment the PCMCIA 68-pin female mechanical connector (105) and the PCMCIA 68-pin male mechanical connector (107) conform with the PCMCIA standard wherein both data storage ("memory") and peripheral expansion ("I/O") card connector types are defined. Such connectors are known in the art and have in the past been available, for example, by contacting the AMPS corporation at 3800 Reidsville Road Winston-Salem, N.C. 27102.

Referring back to FIG. 1, the peripheral device (101) is coupled to the interface (129), specifically the Card Logic Unit (111). In operation the Card Logic Unit (111) is a switching circuit that switches between the PCMCIA mode of operation and an alternative mode of operation, specifically, a RS-232 serial mode in FIG. 1. The PCMCIA mode of operation, when enabled, is effected by coupling the card logic unit (111) to the PCMCIA logic (112) via the PCMCIA electrical bus (119). The alternative mode of operation, when enabled, is effected by coupling the card logic unit (111) to the alternative interface logic (113) via the card alternative interface bus (115). The PCMCIA logic (112) when operating is coupled to and controls the Radio Unit (117) by way of the PCMCIA radio interface bus (116). The alternative interface logic (113) when operating, is coupled to and controls the radio unit (117) by way of the alternative radio interface bus (114). The Radio Unit (117), preferrably includes a controller that interfaces between the PCMCIA logic (112) or alternative interface logic (113) and a transceiver (neither specifically shown). In any event the radio unit, specifically the transceiver is coupled to the antenna (121) and operates to transceive RF signals carrying data modulation.

In the preferred embodiment of the present invention the card alternative interface logic (113) is or provides an electrical interface that sends and receives serial RS-232 control signals over the card alternative interface bus (115). The Card Logic Unit (111), in effect, selects the card alternative interface bus (115) and routes the serial RS-232 control signals to and from the PCMCIA 68-pin female connector (105) that is coupled to the interface (129). The interface (129) couples to a standard PCMCIA 68-pin male mechanical connector (107) in the applications device (103). The Socket Logic Unit (109) coupled to the male mechanical connector (107) routes the serial RS-232 control signals over socket alternative bus (131) to RS-232 Drivers (123). RS-232 data signals generated and received by the RS-232 drivers (123) are coupled through the computer I/O (127), specifically the RS-232 data bus to connector (125) and thus the computer (102). In this manner, serial RS-232 control signals are routed through an ordinarily standard PCMCIA interface to couple a computing device (100) or more specifically a computer (102) to a peripheral device (101), here a wireless data communications modem.

Other embodiments of the present invention could comprise, but are not limited to, other alternative interface logic (113) including, for example, various well known analog and digital voice interfaces, parallel data interfaces, ISDN or T1 telephony interfaces, two wire or four wire analog telephony interfaces, or various proprietary interfaces, or combinations of the above. The alternative interfaces are well known in the art and are defined by standards published by numerous Standards organizations including the Electronic Industry Association (EIA), Telecommunications Industry Association (TIA), International Telegraph and Telephone Consultative Committee (CCITT), etc..

Figure 2:
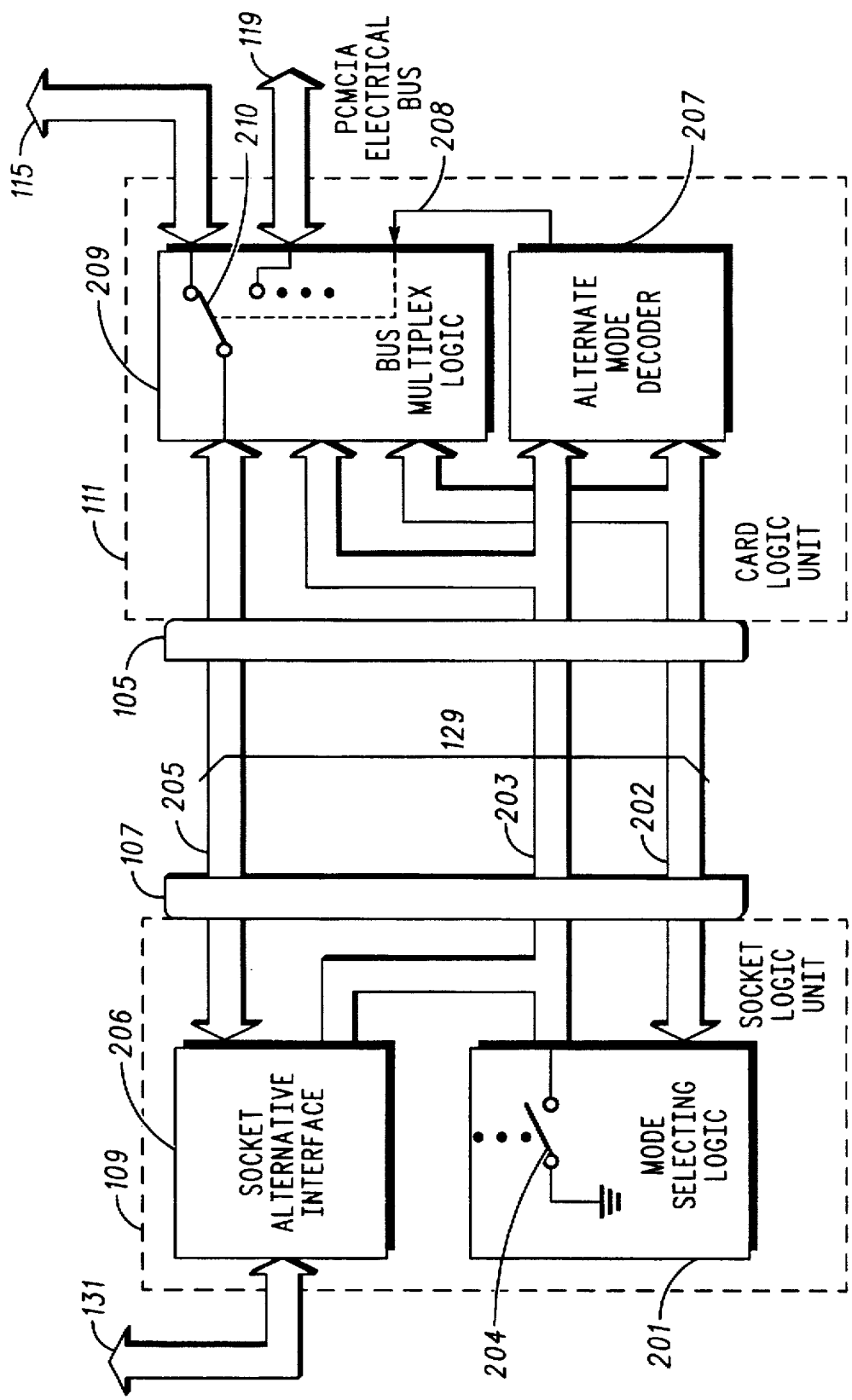
FIG. 2 is a detailed block diagram of the FIG. 1 embodiment of the present invention.

For a more thorough description, including the relevant details of the operation of the alternative interface, the reader is referred to FIG. 2 in which like reference numerals refer to like elements from FIG. 1. The socket logic unit (109), standard PCMCIA 68-pin male mechanical connector (107), interface (129) including data lines (205) address lines (203) and control lines (202), standard PCMCIA 68-pin female connector (105), and the card logic unit (111) are shown. The socket alternative interface (206) of the socket logic unit (109) routes signals from the socket alternative bus (131) to one or more data, address, or control lines (205, 203, 202). Mode selecting logic (201) within the socket logic unit (109) comprised of a plurality of address selecting switches (204) sets or presents a unique code to provide a code signal on the address and/or control lines (203, 202). Setting the unique code includes selecting a predetermined combination of address and control signals or lines. Thus the code signal is a uniquely defined combination of address and/or of control line states on the address and control lines (203, 202). The uniquely defined address and/or combination of control line states is preferably applied by connecting a number of pins, thus lines, on one or the other mating half of the PCMCIA 68-pin mechanical connector (105, 107) (Note: FIG. 2 depicts the male mechanical connector (107)) to a reference potential, such as the positive power supply signal (VDD) or ground. When the combination of address and/or control lines (205, 203) is connected to a reference potential other than ground, as depicted in FIG. 2, the code signal will be available to the peripheral device (101) on power up of the computing device (100).

When the code signal, specifically the uniquely defined combination of address and/or control line states, is detected by alternate mode decoder logic (207) of the card logic unit (111) or switching circuit, an alternate_enable signal (208) is asserted. The assertion of the alternate_enable signal (208) in response to the code signal, switches from a PCMCIA mode of operation to an alternate mode of operation, such as a serial mode like RS-232. The alternate_enable signal (208) causes this change in operating mode by disconnecting the PCMCIA mode of operation and enabling the serial mode of operation. Specifically the alternate_enable signal (208) is coupled to a bus multiplex logic (209) that includes a plurality of multiplexing switches (210). The plurality of multiplexing switches (210) operate to route the signals on the socket alternative bus (131) to the card alternative interface bus (115). When this uniquely defined address and/or combination of control line states is not detected by alternate mode decoder logic (207) of the card logic unit (111), as when the card is used with a computing device complying with the standard PCMCIA electrical specification, the alternate_enable signal (208) is not asserted causing the bus multiplex logic (209) to route the normal PCMCIA electrical lines and thus signals to the PCMCIA electrical bus (119).

In an alternative embodiment of the switching operation, the alternate_enable signal (208) can generate an interrupt or another signal detectable by a micro controller (not specifically shown), which can in turn control the multiplex switch selection. It will be appreciated by those skilled in the art that alternative embodiments of the switching mechanism, more specifically the card logic unit (111) and in particular the operable elements of multiplexing switches (210) include, but are not limited to, tristate buffers, such as 74HC244A, 74HC241, logic multiplexers such as 74HC153, 74HC1157, analog switches, for example 74HC4053, 74HC4016, mechanical relays, and similar standard switches. It will be further appreciated by those skilled in the art that alternative embodiments of the alternate mode decoder logic (207) include, but are not limited to, AND-OR gate combinations and n-to-$2^n$ binary decoders such as a MC74HC138A, 1-of-8 decoder. Such switching mechanism and decoder logic circuits are known in the art and have in the past been available by contacting Motorola, Inc. at 1303 East Algonquin Road, Schaumburg, Ill. 60193.

Those skilled in the art will recognize that the instant invention provides an apparatus that is within the physical dimensions dictated by the current PCMCIA trend and is additionally capable of detecting the type of electrical interface that the computing device is expecting and further transparently and automatically transforming itself into that interface type. It will also be apparent to the skilled that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A multimode apparatus operable in either a PCMCIA mode or a serial mode, comprising:

a peripheral unit having a first PCMCIA interface connector for receiving a second PCMCIA interface connector, the first PCMCIA interface connector having data lines and address lines;

a PCMCIA logic unit coupled to the peripheral unit and operable when the apparatus is in the PCMCIA mode;

a serial logic unit coupled to the peripheral unit and operable when the apparatus is in the serial mode; and a card logic unit coupled to the PCMCIA logic unit via a PCMCIA bus and the serial logic unit via a serial bus and coupled to the data lines and address lines of the first PCMCIA interface connector, being responsive to a mode signal from an external mode selecting logic over at least said address lines for switching between the PCMCIA mode and the serial mode of operation.

2. The apparatus of claim 1, further comprising an external connector coupled to the card logic unit wherein the card logic unit comprises a bus multiplex logic coupled to the PCMCIA bus and serial bus, wherein the bus multiplex logic comprises a switch for coupling the external connector and the PCMCIA bus when the mode signal is indicative of a PCMCIA mode, and for coupling the external connector and the serial bus when the mode signal is indicative of a serial mode.

3. The apparatus of claim 2, wherein the switch is selected from the group consisting of:

tristate buffers;

logic multiplexers;

analog switches; and mechanical relays.

4. The apparatus of claim 1 wherein the peripheral unit is a radio unit coupled to the PCMCIA logic unit via a first bus and to the serial logic unit via a second bus.

5. The apparatus of claim 1 wherein the external mode selecting logic is a PCMCIA to serial converter coupled to a host processor, the mode signal being provided to the card logic unit on power up of the host processor.

6. A multimode apparatus operable in either a PCMCIA mode or a serial mode, comprising:

a peripheral unit having a first PCMCIA interface connector for receiving a second PCMCIA interface connector, the first PCMCIA interface connector having data lines and address lines;

a PCMCIA logic unit coupled to the peripheral unit and operable when the apparatus is in the PCMCIA mode;

a serial logic unit coupled to the peripheral unit and operable when the apparatus is in the serial mode; and a card logic unit coupled to the PCMCIA logic unit via a PCMCIA bus and the serial logic unit via a serial bus and coupled to the data lines and address lines of the first PCMCIA interface connector, being responsive to a mode signal from an external mode selecting logic over at least said address lines for switching between the PCMCIA mode and the serial mode of operation, wherein the card logic unit comprises a bus multiplex logic coupled to the PCMCIA bus and serial bus and coupled to the data lines and the address lines for multiplexing at least the data lines to the PCMCIA bus and serial bus, and a mode decoder for receiving the mode signal, wherein the mode signal comprises a combination of address and control signals.

7. A multimode apparatus operable in a PCMCIA mode or a first alternate mode of operation, the apparatus comprising:

an adapter having an alternate interface coupling a first PCMCIA connector and an external connector, the adapter being operable to provide an alternate mode signal when the external connector is coupled to an external processor; and a PCMCIA unit comprising:

a second PCMCIA connector coupled to the first PCMCIA connector the second PCMCIA connector having data lines and address lines;

a peripheral unit;

a PCMCIA logic unit coupled to the peripheral unit and operable when the apparatus is in a PCMCIA mode;

an alternate mode logic unit coupled to the peripheral unit and operable when the apparatus is in the alternate mode; and a card logic unit coupled to the data lines and address lines of the second PCMCIA connector and operable for coupling one of the PCMCIA logic unit and the alternate mode logic unit to the PCMCIA connector, and for coupling the alternate mode logic unit to the second PCMCIA connector responsive to the alternate mode signal, selectively in response to the alternate mode signal from said adapter over at least said address lines.

8. The apparatus of claim 7, further comprising a PCMCIA bus for coupling the card logic unit and the PCMCIA logic unit, and an alternate bus for coupling the card logic unit and the alternate logic unit, wherein the card logic unit comprises a bus multiplex logic operable for coupling the second PCMCIA connector to one of the PCMCIA bus and serial bus, and a mode decoder for receiving the mode signal and controlling the coupling of the card logic unit, wherein the mode signal comprises a combination of address and control signals.

9. The apparatus of claim 8, wherein the bus multiplex logic comprises a switch for coupling the second PCMCIA connector and the alternate bus when the mode signal is indicative of the alternate mode.

10. The apparatus of claim 9, wherein the adapter further comprises a mode selection logic responsive to a signal from the external processor to provide the alternate mode signal.

11. The apparatus of claim 9, wherein the switch is selected from the group consisting of:

tristate buffers;

logic multiplexers;

analog switches; and mechanical relays.

12. The apparatus of claim 7 wherein the adapter is a serial to PCMCIA converter operable to provide the mode signal on power up of the external processor.

13. The apparatus of claim 7 wherein the alternate interface is selected from a group consisting of:

an analog voice interface;

a digital voice interface;

a parallel data interface;

an ISDN interface;

a T1 telephony interface;

a two wire analog telephony interface;

a four wire analog telephony interface; and a serial data interface.

14. A method of configuring a peripheral device from a PCMCIA mode of operation to an alternate mode of operation, the method comprising the steps of:

releasably coupling an adapter having a first PCMCIA connector to a peripheral unit having a second PCMCIA connector, the adapter being operable for coupling a peripheral device to a host processor;

providing a mode signal from the adapter to the peripheral logic unit, the mode signal being provided over at least address lines from the adapter to the peripheral logic unit; and switching a peripheral logic unit switch, responsive to the mode signal, so as to uncouple a peripheral connector, operable for coupling the peripheral device to one of the adapter and other external devices, from a PCMCIA interface and to couple the peripheral connector to an alternate interface logic thereby switching the peripheral device from the PCMCIA mode of operation to the alternate mode of operation.

15. The method of claim 14 wherein the step of providing further comprises the step of:

selecting a combination of address signals and control signals.

16. The method of claim 14 wherein the step of switching further comprises the step of detecting the mode signal.

17. The method of claim 14 wherein the alternate mode of operation is a serial mode of operation.

* * * * *